Figures 1, 2:
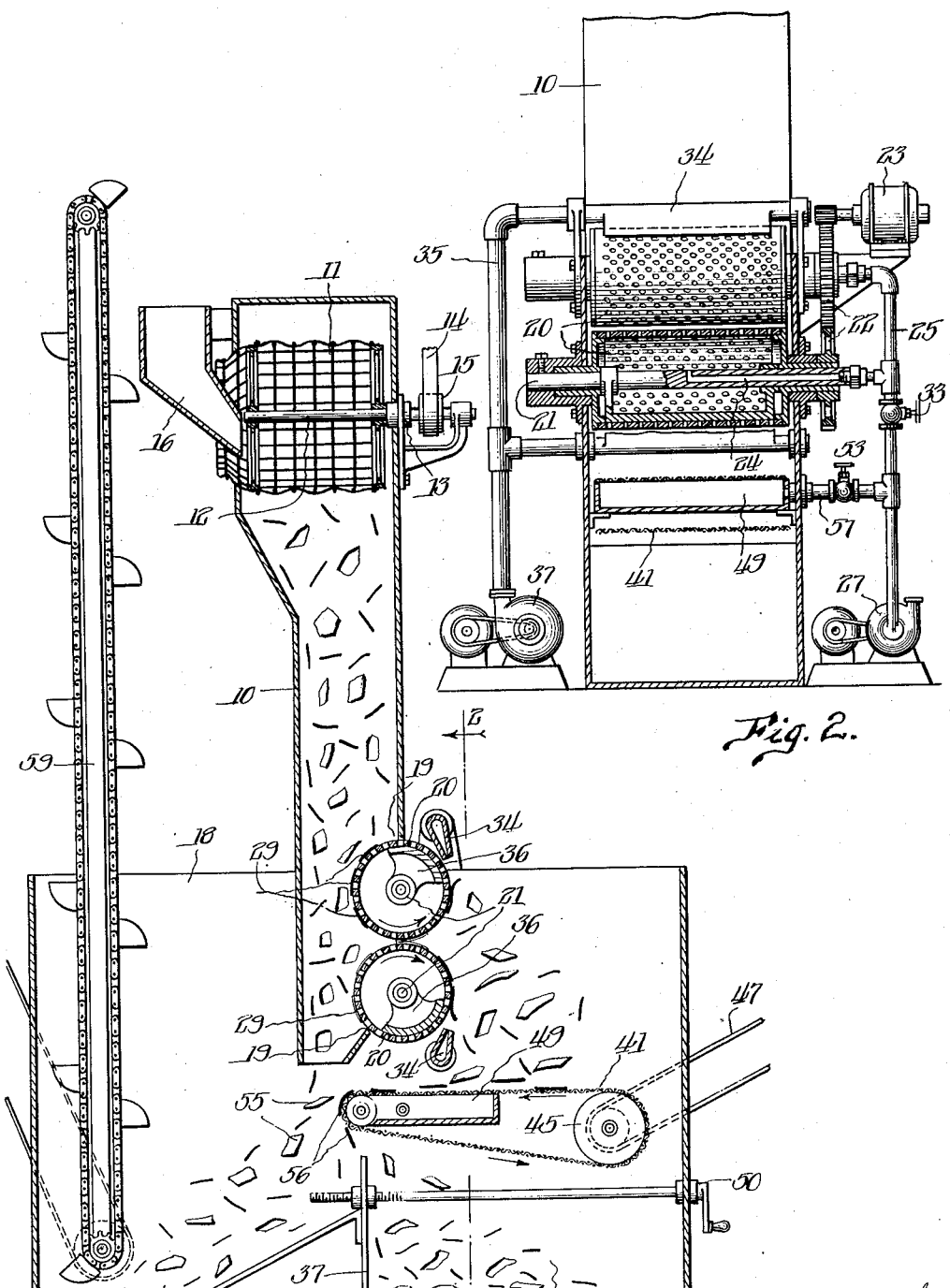

June 13, 1933. L. T. FREDERICK 1,913,876
MICA SEPARATING AND SORTING MACHINE
Original Filed Oct. 4, 1926

Inventor:
Louis T. Frederick,
Cheever & Cox. attys.

Patented June 13, 1933

1,913,876

UNITED STATES PATENT OFFICE

LOUIS T. FREDERICK, OF VALPARAISO, INDIANA, ASSIGNOR, BY MESNE ASSIGNMENTS, TO CONTINENTAL DIAMOND FIBRE COMPANY, OF NEWARK, DELAWARE, A CORPORATION OF DELAWARE

MICA SEPARATING AND SORTING MACHINE

Original application filed October 4, 1926, Serial No. 139,288. Divided and this application filed July 7, 1928. Serial No. 290,951.

My invention relates in general to mica treating apparatus and has more particular reference to an improved device for separating mica into its constituent laminations and sorting the laminæ in order to separate the thin from the thick flakes and comprises a division of my co-pending application, Serial Number 139,288 filed October 4, 1926.

The apparatus of my invention also is adapted to continuously retreat the thicker flakes or sections of mica in order to further separate the mica into its constituent laminations as a integral part of the separating and sorting process.

Mica, being a laminated substance having properties which make it effective as an insulator, is widely used, in the form of composite sheets or plates built up of mica flakes, for electrical insulation. In order to construct these sheets or plates it is necessary to separate the crude or raw mica, which comes in blocks, into its constituent laminations, the insulating product being known as flaked mica. In practice it has been found that the thinner mica flakes are best adapted for the manufacture of mica sheets for various purposes and the present apparatus is designed to receive and treat the mica blocks in order that they may be separated into their constituent laminations and to separate the thinner from the thicker flakes in order to provide a uniform grade of flaked mica which may be used in the manufacture of various mica products.

I have discovered that by tumbling the blocks of mica about in a specially constructed screen which is adapted to separate the blocks somewhat and to snow the separated portions downwardly under the influence of gravity in the form of a cloud of mica flakes, and by arranging a suction apparatus adjacent the path through which the cloud descends, I am able to separate a grade of mica flakes having a desired thinness which may be controlled by regulating the force of suction exerted by the suction apparatus, the heavier flakes falling downwardly past the apparatus due to their weight and inertia. If the flakes are snowed from a considerable height the momentum of the heavier flakes, when they pass the suction apparatus, is such that they will pass the suction apparatus without being separated from the cloud, while the lighter flakes are attracted to the suction apparatus and thus removed from the flake cloud.

The flakes thus removed from the cloud of mica flakes are not entirely uniform in thickness and it may be desirable for certain purposes to further separate these flakes and I have provided an apparatus adapted to receive the separated flakes and to further grade the flakes by utilizing the inertia of the heavier flakes in order to separate them from the lighter flakes.

One important object of my present invention is to provide an apparatus for grading flaked mica by pneumatic means whereby the lighter flakes may be separated from the heavier flakes.

Another important object of the invention is to provide an apparatus for grading mica flakes by utilizing the inertia of the flakes in order to separate the heavy flakes from the lighter flakes.

Still another object of my present invention is to provide an apparatus for separating mica into its constituent laminæ and sorting said laminæ into grades in accordance with the thickness thereof and for returning the thicker flakes for retreatment whereby a uniform grade of relatively thin flakes may be produced from blocks of raw mica.

Numerous other objects and advantages of the invention will be apparent as it is more fully understood from the following description which, taken in connection with the accompanying drawing, discloses a preferred embodiment of my invention.

Referring to the drawing:

Figure 1 is a vertical cross section taken through a mica separating and sorting apparatus embodying my invention; and Figure 2 is a vertical cross section taken substantially along the line 2—2 in Figure 1.

For a complete understanding of the operation of the present apparatus illustrated in the drawing, it should be remembered that mica flakes of the desired thickness are extremely thin and light and are possessed of greater flexibility than the thicker and less desirable flakes.

Before introducing the blocks of untreated mica, from which it is desired to produce flaked mica, into the apparatus, I find it advisable to soak the mica blocks for an appreciable interval in a mixture of soapstone and water and then to dry the blocks so treated in any convenient manner as for instance by conveying the mica blocks through an oven or over steam tables. This treatment of the mica blocks renders them more workable and assists in reducing the blocks to their constituent laminations in the apparatus of my invention.

To illustrate my invention I have shown in the drawing a tower or compartment 10 which extends vertically and is provided at its upper end with a reticular tumbling drum or snowing device 11, rotatably mounted within the tower which is enlarged at its upper end for this purpose. The tumbling drum 11 is carried by a shaft 12 which is suitably journaled in the bearings 13 carried in a support bracket which is mounted to the side of the conduit 10. Means comprising a belt 14 and a pulley 15 mounted on the shaft 12 is provided for rotating the tumbling drum. The tumbling drum is open at one end 17 to receive the end of a delivery hopper 16 through which mica blocks may be introduced into the interior of the reticular tumbling drum. At its lower end the tower or conduit 10 terminates in a compartment 18. As the tumbling drum is rotated, the mica blocks therein are tumbled about and somewhat broken into their laminations and the smaller sections thus formed are discharged through the interstices of the tumbling drum into the conduit or compartment 10 in the form of a cloud of mica flakes. The flakes fall downwardly in the conduit under the influence of gravity and are finally deposited into the box 18.

Adjacent the lower end of the conduit the walls are provided with an aperture 19 in which is mounted a suction apparatus which, in the illustrated embodiment, comprises a pair of perforated suction rolls 20 which extend partially into the interior of the conduit 10. These rolls are mounted for rotation upon shafts 21 which are suitably supported in the aperture 19. The rolls 20 are provided with gears 22 whereby they may be rotated by a driving motor 23 or other suitable source of power. Each shaft is provided with an axial channel 24 which opens at its inner end into the interior of the suction roll and which is connected at its outer end to a pipe 25. This pipe is connected with a pump 27 or other suitable suction apparatus.

By means of this arrangement, suction is created within the rolls 20 so that a draft of air may be maintained through the perforations in the rolls 20. This draft of air attracts the thinner, lighter flakes from the cloud of flakes passing downwardly in the conduit 10 and draws the same onto the surface of the rolls. This effect is illustrated in Figure 1 of the drawing which shows mica flakes 29 lying upon the surfaces of the rollers 20. The conduit 10 is of a length such that the heavier mica flakes acquire considerable momentum by the time they reach a point opposite the suction apparatus, and the heavier flakes consequently pass downwardly through the conduit without being deflected by the suction. Manifestly, by increasing or decreasing the suction in the rolls created by the pump 27, the thickness, which corresponds to the weight of the flakes attracted to the rolls, may be regulated. By increasing the suction heavier flakes are attracted and by decreasing the suction the attracted flakes are lighter and consequently thinner. Such regulation may be accomplished by means of a valve 33 seated in the pipe 25 between the pump 27 and the shafts 21. In this manner the thinner flakes in the cloud traversing the conduit 10 are attracted to the surfaces of the rolls 20 while the remainder of the flakes comprising the cloud are discharged from the lower end of the tower into the compartment 18.

The rolls are rotated in opposite directions so that the flakes attracted thereto by the suction are carried between the rolls to a point outside of the conduit 10. In order to remove the mica flakes from the rolls at this point I have provided a novel means for stripping the flakes from the rolls. For this purpose elongated nozzles 34 are provided adjacent each of the rolls in position to direct a blast of air tangentially against the surface of the adjacent roll throughout its entire length. These nozzles are connected by means of suitable piping 35 to a blower 37 or other means for creating air pressure within the piping. These air blasts tangentially across the face of the rolls counteract the suction exerted by said rolls upon the mica flakes and remove the flakes adhering to and carried by the rolls and deposit the flakes in the compartment 18. I have also provided arcuately curved members 36 supported within the rolls 20 by the shafts 21. These members are arranged to close the apertures of the rolls when they come opposite the nozzles 34 so that the mica flakes may be released from the rolls and fall into the compartment 18. The compartment 18 is divided by means of a partition 37 into two portions 38 and 39 and the partition is so positioned in the compartment 18 that all of the flakes discharged from the lower end of the tower 10 are deposited in the portion 38 while the lighter and thinner flakes removed from the conduit 10 by the suction rolls are deposited in the portion 39.

The grade of mica thus separated from the falling cloud in the conduit 10 and deposited in the compartment 39 is suitable for making many composite mica products, however, it is some times desirable to produce a finer grade of mica flakes by means of the devices and I have provided a novel arrangement for further sorting the mica flakes extracted from the mica cloud by the suction rolls 20. This apparatus comprises a foraminated conveyer 41 comprising a continuous belt carried around spaced sprockets 43 and 45. The sprocket 43 is of smaller diameter than the sprocket 45 and is mounted approximately above the partition 37 while the sprocket 45 is arranged within the portion 39 of the compartment 18. The sprocket 45 is driven, as indicated, by a belt 47 which leads to any convenient variable speed prime mover (not shown) and means for controlling the speed of the prime mover is also provided. This prime mover and its control may be of any convenient or well known type and it has not been thought necessary to illustrate the same in the drawing. The conveyor travels in the direction indicated by the arrows in Figure 1 and the upper stretch is arranged in position to receive the mica removed from the rolls 20. The conveyor 41 carries such received mica toward the smaller sprocket 43 and the partition 37. Adjoining the sprocket 43 is a suction element or compartment 49 which is open to the conveyor 41 while the same passes around the sprocket 43 and also for a considerable distance before the conveyor reaches the sprocket. The suction element 49 is connected by a pipe 51 with the pipe 25 so that suction may be created within the element 49 by means of the pump 27 heretofore mentioned in connection with the suction rolls 20. The pipe 51 is provided with a valve 53 similar to the valve 33 whereby the suction within the element 49 may be regulated. The suction exerted through the conveyor 41 in this manner may be thus regulated to cause the flakes deposited on the conveyor from the rolls 20 to adhere thereto as they are carried around the sprocket 43. By regulating the speed at which the conveyor 41 is driven, the heavier flakes deposited in the conveyor may be ejected therefrom as the conveyor travels around the sprocket 43 and in such case will fall into the compartment 38 while the thinner flakes, which are sufficiently thin to be retained on the conveyor by the suction of the element 49, will be carried around the sprocket 43 and deposited in the portion 39 of the compartment. This effect is illustrated in Figure 1 of the drawing in which heavy flakes 55 are shown being thrown from the conveyor 41 into the portion 38 of the compartment while light flakes 56 are shown being carried around the sprocket 43 and deposited into the portion 39. I have provided means 50 comprising a rotatable rod having an operating handle and having threaded engagement with the partition 37 whereby the position of the partition within the compartment 18 may be varied, that is to say, the partition may be moved beneath the sprocket 43 so that the thicker of the flakes received from the belt 41 in the compartment portion 39 may be regulated, it being apparent that the heavier of the flakes 55 will be thrown from the conveyor sooner than the lighter flakes, that is to say, the flakes thrown from the conveyor 41 are ejected at points depending upon the weight of the flakes, and by moving the partition 37 I am able to receive flakes of any desired weight in the compartment portion 39. By moving the partition 37 to the left in Figure 1, heavier flakes will be deposited in the portion 39 whereas by moving the partition to the right in Figure 1, the weight of the flakes received in the portion 39 will be reduced. It will be apparent also that by increasing the speed at which the conveyor 41 is carried around the sprocket 43 the maximum weight and consequently the thickness of the flakes carried around the sprocket 43 may be reduced to any desired minimum.

It will thus be seen that the portion 38 of the compartment 18 is adapted to receive all the flakes having a thickness greater than the desired maximum and I have shown an elevator 57 having an end extending into the compartment 38 for the purpose of conveying the thicker mica flakes from the compartment and discharging the same into the hopper 16 in order to reintroduce the flakes into the reticular tumbling drum 11. By this means all the mica deposited in the compartment portion 38 may be again subjected to the action of the tumbling drum and the suction and inertia separators.

I do not claim herein the broad subject-matter of invention set forth and claimed in my copending applications, Serial Number 139,219, filed October 2, 1926, and Serial Number 287,503, filed June 22, 1928.

Having thus described my invention, what I claim as new and desire to secure by Letters Patent is:

1. A mica sorting machine having a conduit provided with a lateral opening, means mounted in said conduit to snow a cloud of mica flakes into said conduit for passage therethrough, a pair of perforated hollow rolls mounted for rotation in the opening of said conduit, means for creating an inward suction through the perforations in said rolls to select certain of said mica flakes during their passage through the conduit, and remove them to the exterior of the conduit by the rotation of the rolls.

2. A mica sorting machine having a conduit provided with a lateral opening, means mounted in said conduit to snow a cloud of mica flakes into said conduit for passage therethrough, a pair of perforated hollow rolls mounted for rotation in the opening of said conduit, means for creating an inward suction through the perforations of said rolls to select a portion of said flaked mica during its passage through the conduit and remove such selected portion from the conduit by the rotation of the rolls, and means on the exterior of the conduit for removing the mica so selected from the rolls.

3. A mica sorting machine having a conduit provided with a lateral opening, means mounted in said conduit to snow a cloud of mica flakes into said conduit for passage therethrough, a pair of perforated hollow rolls mounted for rotation in the opening of said conduit, means to draw mica flakes from said cloud to said rolls, means on the exterior of the conduit for removing the mica so selected from the rolls, and means for again sorting the mica so removed from the rolls.

4. A mica sorting machine having a conduit provided with a lateral opening, means mounted in said conduit to snow a cloud of mica flakes into said conduit for passage therethrough, a pair of perforated hollow rolls mounted for rotation in the opening of said conduit, means on the exterior of the conduit, means to draw mica flakes from said cloud to said rolls, for removing the mica so selected from the rolls, air blast nozzles on the exterior of the conduit for removing the mica from the rolls, and means for further sorting the mica so removed.

5. A mica sorting machine having a conduit for the passage of mica therethrough, means for selecting and removing a portion of the mica as it passes through said conduit, a multiple compartment box one of the compartments of which receives the mica passing completely through said conduit, a conveyor adapted to receive the mica so selected and removed from the conduit, and means whereby said conveyor delivers a portion of the mica thereon into the compartment receiving mica from said conduit and carries the remainder of said mica to other compartments of the box.

6. A mica sorting machine having a conduit for the passage of mica therethrough, means for selecting and removing a portion of the mica as it passes through said conduit, a multiple compartment box one of the compartments of which receives the mica passing completely through said conduit, a recticular conveyor adapted to receive the mica so selected and removed from the conduit, and suction means co-operating with said reticular conveyor for retaining a portion of the mica thereon while the conveyor delivers the remainder to the compartment receiving from the conduit.

7. In a mica sorting machine, a foraminous belt operating over spaced rollers and means for creating a suction through said belt adjacent one of said rollers whereby to hold flaked mica upon the belt and means for moving the belt over the rollers at a relatively high rate of speed whereby to remove certain of said flakes from the belt against said suction by means of the inertia of said flakes when the belt passes around the roller.

8. In a mica treating apparatus, in combination, a compartment having side walls, means for creating a cloud of mica flakes within said compartment and suction means for withdrawing flakes from the compartment, said means comprising suction rollers exposed within the compartment and means for rotating the rolls whereby flakes may be drawn onto the rollers and removed from the compartment by the rotation thereof.

9. In a mica treating apparatus, in combination, a compartment having side walls, means for creating a cloud of mica flakes within said compartment and suction means for withdrawing flakes from the compartment, said means comprising suction rollers exposed within the compartment and means for rotating the rolls whereby flakes may be drawn onto the rollers and removed from the compartment by the rotation thereof and pneumatic means for stripping the flakes so withdrawn from the rollers.

10. In a mica treating apparatus, in combination, a compartment having side walls, means for creating a cloud of mica flakes within said compartment and suction means for withdrawing flakes from the compartment, said means comprising circulating foraminous members exposed within the compartment and means for shifting the members, means creating suction within and behind the shifting foraminous members whereby flakes may be drawn onto the members and removed from the compartment by the movement thereof and means for removing the mica flakes from the members.

11. A mica grading machine comprising, in combination, means forming a compartment having a lateral opening, means to create a cloud of mica flakes in said compartment, a perforated member exposed to the interior of the compartment at said opening, means to create a suction behind the portions of the member exposed in said opening to draw the lighter flakes in the cloud onto and cause same to adhere on the perforated member, and means to shift the member to carry the so selected flakes out of the compartment, through said lateral opening, and a receiver for the flakes so selected and removed from the chamber, said receiver comprising a foraminous belt operating around spaced rollers and means for creating a suction through the belt as it passes around one of the rollers and means for moving the belt at a relatively high rate of speed around the rollers to remove certain of the flakes from the belt against the suction by means of the inertia of the flakes as the belt passes around the roller.

In witness whereof, I have hereunto subscribed my name.

LOUIS T. FREDERICK.